Patented Aug. 5, 1952

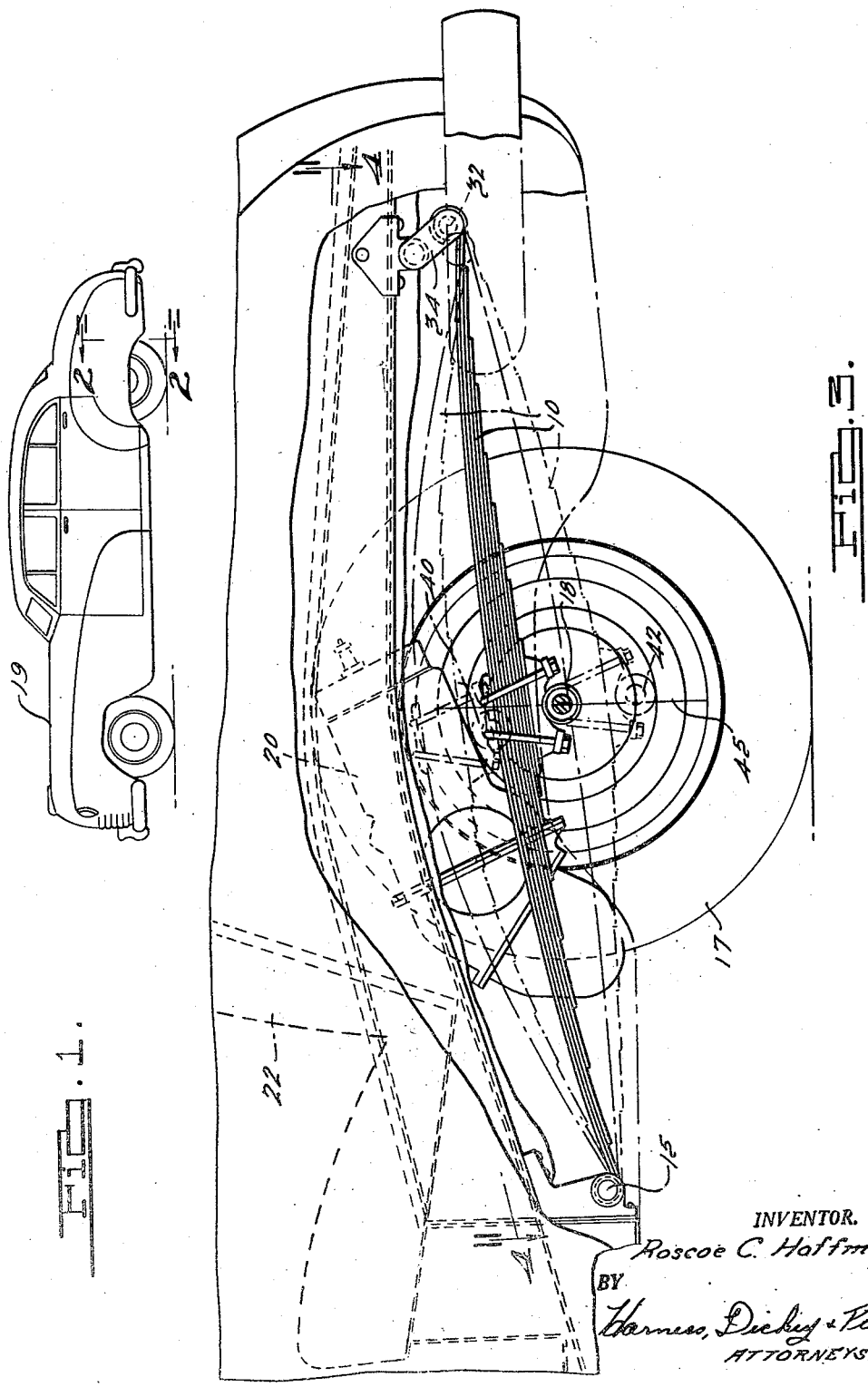

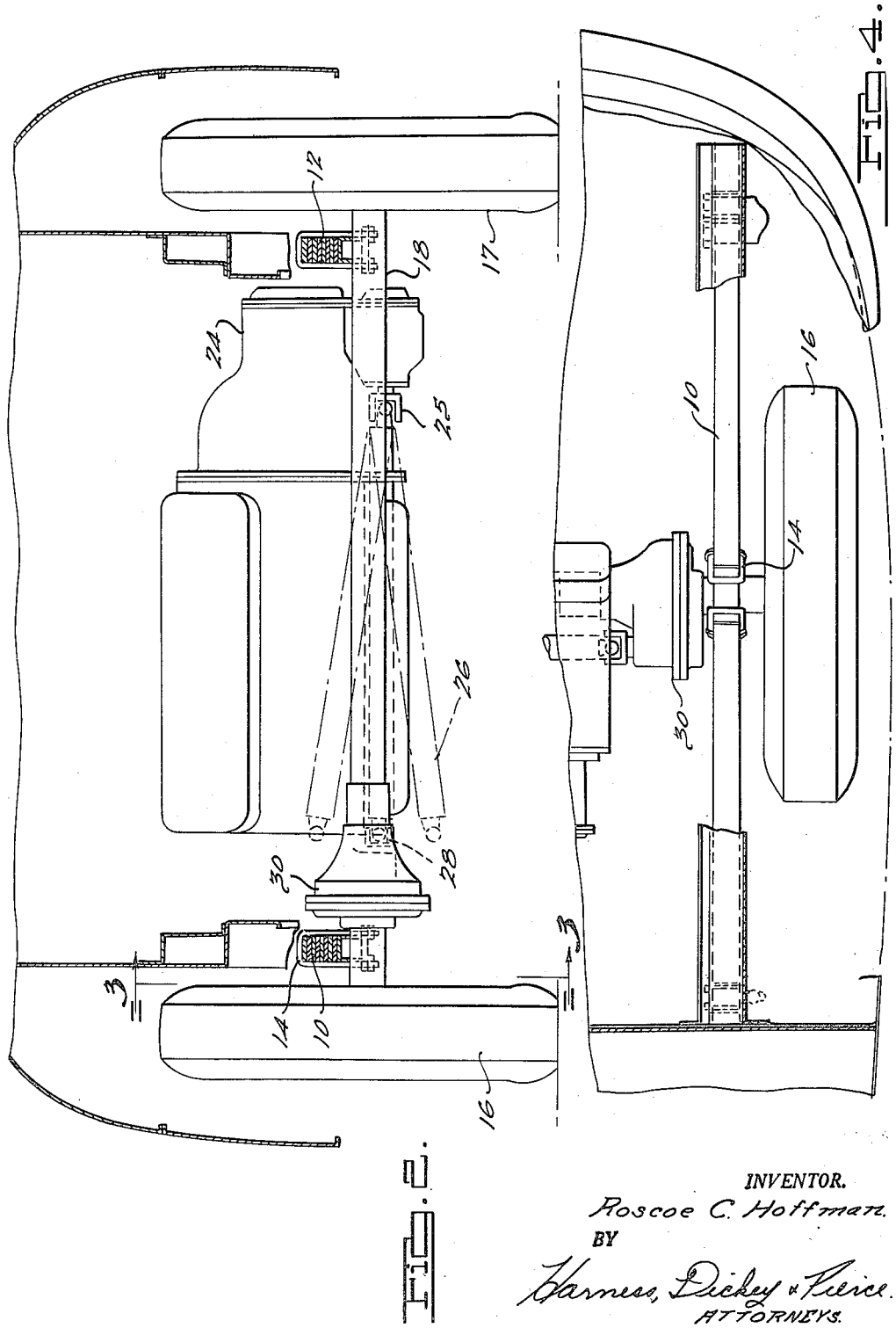

2,606,037

UNITED STATES PATENT OFFICE 2,606,037

REAR AXLE SUSPENSION FOR MOTOR VEHICLES OF THE REAR ENGINE TYPE

Roscoe C. Hoffman, Detroit, Mich.

Application October 7, 1948, Serial No. 54,181

1 Claim. (Cl. 280—124)

The present invention relates to vehicular spring suspension systems, and is particularly concerned with vehicles having a relatively large proportion of the sprung weight concentrated at the rear, such as is commonly the case with vehicles having rear mounted engines.

Objects of the invention include the provision of improved means for increasing the stability, roadability, ease of steering and handling, and safety, of vehicles of the indicated character.

Vehicles having their propulsive engine located in the rear have the center of gravity much farther toward the rear than do equivalent vehicles with front mounted engines, and the directional stability of such vehicles in inherently impaired due to the fact that the center of mass is moved farther from the front wheels by which the vehicle is steered. In effect, therefore, the mass of the vehicle is more independent of the steering wheels, and more pronounced in its behavior under the influence of outside disturbing forces, so that it takes increased effort and action on the part of the front wheels to maintain control over steering and lateral movements of the vehicle. Disturbing outside forces tending to adversely affect the directional stability of the vehicle include impacts against tires, centrifugal force, side winds and other side forces, and tire blowouts. In the case of blowouts, the active radius of the wheel carrying the tire which has blown out will be quickly and greatly reduced. The smaller rolling radius of this wheel causes it to contact the road at a reduced velocity, increasing the tendency to swerve the vehicle sidewise in a direction toward the blown tire, and the car also tends to sway over sharply toward the same side. With the center of gravity farther back, as in rear mounted engine vehicles, it is more difficult to counteract these effects by steering movements of the front wheels, and when utilizing conventional and previously known spring suspensions with rear engine vehicles, the danger represented by a blowout is considerably increased, particularly when a blowout occurs on a curve and/or at high speeds. Under such conditions, with the weight concentrated near the rear axle, it is extremely difficult to oppose the forces tending to cause the vehicle to follow a path out of the curve.

My invention therefore includes among its objects the provision of novel suspension means adapted to compensate for the unstable conditions resulting from lateral forces acting upon the vehicle. A related object is to provide such an improved suspension system, particularly useful in the construction of vehicles having weight distribution of the order possessed by vehicles employing rear mounted engines, although restricted to such vehicles, and incorporating rear wheels so mounted that any force tending to displace one wheel upwardly more than the other relatively to the vehicle will automatically change the course of both rear wheels with respect to the vehicle, so as to turn the rear wheels in a direction to steer the rear part of the vehicle away from the side upon which the wheel has been raised (or the frame depressed).

Another important object of the invention is to provide such an improved spring suspension system utilizing components which are essentially conventional in their construction and arrangement, and which can be economically manufactured and assembled.

Other objects and advantages will be apparent upon consideration of the present disclosure in its entirety.

In the drawing:

Figure 1 is a side elevational view of a motorcar incorporating a spring suspension system embodying the principles of the present invention:

Fig. 2 is a partly diagrammatic sectional elevational view taken substantially upon the line 2—2 of Fig. 1 and looking in the direction of the arrows;

Fig. 3 is a sectional view taken substantially on the line 3—3 of Fig. 2 and looking in the direction of the arrows, and also partly diagrammatic; and, Fig. 4 is a diagrammatic plan view, with parts broken away, taken substantially on the line 4—4 of Fig. 3 and looking in the direction of the arrows.

Referring now to the drawing, leaf springs 10, 12 are provided, supported in parallel relation by the rear axle and secured thereto in any suitable manner as by the U-bolts 14, and carrying the sprung portions of the vehicle, to which the ends of the springs are connected by essentially conventional means. As best shown in Fig. 3, however, the forward ends of the springs are located a substantial distance below the level of the rear ends thereof, the front ends being arranged to take the thrust, as by pivotal attachment to the pivot means 15, while the rear ends of the springs are supported by means of swinging shackles 34 in such manner as to permit fore and aft movement. By virtue of this arrangement, the axle, the housing of which is generally designated 18 and which is affixed to the springs approximately midway of their length, may move with respect to the vehicle during springing movements about the front anchor or pivot pins 15 upon a curve approximating a circle, with the front halves of the springs functioning as radius arms.

Due to the inclination of the spring arms, deflection of one spring independently of or with relation to the spring on the other side of the vehicle will cause the affected end of the axle to move on an arc which carries it and the wheel attached to such end forwardly with relation to the vehicle as the wheel rises, while the other end of the axle, unaffected or affected to a lesser extent, may remain substantially in the normal position, or in the opposite relative direction as the case may be. Such tilting of the axle will result in a steering effect upon both rear wheels, due to the fact that the raised end of the axle will move forwardly with relation to the other end. The vehicle will accordingly be steered laterally away and outwardly from the point at which the wheel was raised (or the side toward which the car has swayed). If both rear wheels are lifted simultaneously or to the same extent, however, no turning effect results and the rear wheels remain in their straight ahead positioning.

The vehicle construction shown in Figs. 1-4 includes a body generally designated 19 supported at the rear by wheels 16, 17 connected by the rear axle assembly 18. The engine, generally designated 20, is mounted transversely over the rear axle and behind the rear seat 22 of the sedan-type body illustratively depicted. The engine drives the rear wheels through a transmission generally designated 24, universal joint 25, propeller shaft 26, universal joint 28, and differential generally designated 30. The drive shaft 26 is actually formed of two telescopic sections which permit to adjust itself to variations in the distance between the universal joints 25, 28.

The longitudinally arranged parallel leaf springs 10, 12 support the vehicle upon the axle as previously mentioned, the construction and arrangement of the springs being shown as generally conventional except for their downward inclination toward the front, also previously mentioned. The springs are secured at their forward and rear extremities to the vehicle frame in a manner also conventional, as stated, the top and longest leaf of each spring being looped at both ends to form eyes, the forward eye of each spring encircling the fixed pivot pin 15 while the eye at the rear end of each spring encircles the longitudinally movable or drifting stud arm 32 of the swingable shackle 34.

Due to the fact that the level of the front pivot pin 15 is substantially below that of the rear pivot stud 32, the springs assume, under normal load, an inclined forwardly sloping position. In the embodiment shown, the axle is under the springs and the front pivot pin 15 is approximately at the level of the axle 18, while the rear shackle stud 32 is substantially above the front pivot pin. The spring has reverse camber. The extreme limits of upward and downward movement of the axle are indicated at 40 and 42 respectively. By reference to the line 45 projected vertically through the normal position of the axle (which normal position is shown in full lines), the extent of forward deviation of the axle in response to such extremes of upward and downward relative movement may be perceived.

The functional advantages of the features in question reside in the behavior of the axle 18 in event of impact upon one of the tires or excessive load thereon due to any other cause. In any such eventuality, the axle will be displaced from its horizontal position and/or the body will be tilted with relation to the axle so that the axle is relatively higher, or closer to the frame upon one side than the other. In case of a swaying force which carries the body down upon one side, the axle in effect moves upwardly at that end or closer to the frame, toward or to the position 40 and in so rising moves forwardly, tending to steer the vehicle away from that side. In the case of a tire failure, the car sways down toward the side of the tire failure and the center of gravity moves over toward that side, applying increased loading to the wheel on that side and thereby tending to steer the wheels in such manner as to steer the car away from the side upon which the tire has blown.

While it will be apparent that the preferred embodiments of the invention herein described are well calculated to fulfill the objects and advantages first above stated, it will be appreciated that the invention is susceptible to variation, modification and change without departing from the fair meaning and proper scope of the appended claim.

I claim:

In a motor vehicle of the rear engine type having substantially greater rear wheel loading than front wheel loading, a rear wheel suspension system including a rigid transverse axle assembly, a pair of rear wheels supported by the axle assembly in permanently substantially parallel relation, a vehicle body structure, and means for mounting the body structure upon the axle including an arm oscillatably coupled at its forward end to the body structure of the vehicle and extending angularly upwardly and rearwardly from such coupled position to connection with said axle assembly, said arm comprising a reversely cambered leaf spring assembly inclined from the horizontal, pivotally connected to the body structure at its forward end, shackled to the body structure at its rear end, and secured to and overlying the axle assembly at an intermediate point, the entire spring assembly being inclined upwardly and rearwardly when the parts are in their normal positioning.

ROSCOE C. HOFFMAN.

REFERENCES CITED

The following references are of record in the file of this patent:

UNITED STATES PATENTS

| Number | Name | Date |
|---|---|---|
| 2,417,325 | Roos | Mar. 11, 1947 |